(12) United States Patent
Bentley, Jr. et al.

(10) Patent No.: US 8,937,010 B2
(45) Date of Patent: Jan. 20, 2015

(54) INFORMATION ENCODING USING WIREBONDS

(71) Applicant: International Business Machines Corporation, Armonk, NY (US)

(72) Inventors: William E. Bentley, Jr., Colchester, VT (US); Nathanial W. Bowe, Colchester, VT (US); Alfred J. Brignull, Essex Junction, VT (US); Mark A. DiRocco, South Burlington, VT (US); Thomas C. Rudick, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/779,036

(22) Filed: Feb. 27, 2013

(65) Prior Publication Data

US 2014/0239469 A1 Aug. 28, 2014

(51) Int. Cl.
*H01L 23/488* (2006.01)
*H01L 23/00* (2006.01)

(52) U.S. Cl.
CPC .............. *H01L 24/81* (2013.01); *H01L 23/488* (2013.01)
USPC .......................................... 438/617; 257/673

(58) Field of Classification Search
USPC ......................................... 257/673; 438/617
See application file for complete search history.

(56) References Cited

U.S. PATENT DOCUMENTS

| | | | |
|---|---|---|---|
| 4,263,504 A | 4/1981 | Thomas | |
| 5,866,895 A | 2/1999 | Fukuda et al. | |
| 6,059,168 A * | 5/2000 | Shin et al. | 228/4.5 |
| 6,116,510 A | 9/2000 | Nishino | |
| 6,131,807 A | 10/2000 | Fukuda et al. | |
| 6,557,251 B2 | 5/2003 | Hudson | |
| 6,600,686 B2 | 7/2003 | Huh et al. | |
| 8,187,897 B2 | 5/2012 | Cohn et al. | |
| 8,242,603 B2 | 8/2012 | Check et al. | |
| 8,262,000 B2 | 9/2012 | Denniston, Jr. | |
| 8,282,016 B2 | 10/2012 | Lapstun | |
| 8,286,890 B2 | 10/2012 | Lapstun | |
| 8,291,357 B2 | 10/2012 | Bueti et al. | |

FOREIGN PATENT DOCUMENTS

| | | |
|---|---|---|
| EP | 2479650 | 7/2012 |
| JP | 2009245226 | 10/2009 |
| WO | 2004019670 | 3/2004 |

* cited by examiner

*Primary Examiner* — Whitney T Moore
(74) *Attorney, Agent, or Firm* — Schmeiser, Olsen & Watts; David A. Cain

(57) ABSTRACT

A method and structure for encoding information on an integrated circuit chip. The method includes selecting a set of chip pads of the integrated circuit chip for encoding the information; encoding the information during a wirebonding process, the wirebonding process comprising forming ball bonds on chip pads of the integrated circuit chip and wedge bonds on leadframe fingers adjacent to one or more edges of the integrated circuit chip, the ball bonds and the wedge bonds connected by respective and integral wires; and wherein the information is encoded by varying one or more wirebonding parameters on each chip pad of the set of chip pads, the wirebonding parameters selected from the group consisting of the location of a ball bond, the diameter of a ball bond, both the location and diameter of a ball bond, the location of a wedge bond and combinations thereof.

20 Claims, 6 Drawing Sheets

INFORMATION ENCODING USING WIREBONDS

TECHNICAL FIELD

The present invention relates to the field of integrated circuits chip; more specifically, it relates to on-chip information encoding.

BACKGROUND

Modern integrated circuit chips include electronic chip identification (ECID) circuits that electronically encode a unique integrated circuit (IC) chip identification, or other IC chip related data that can be read out after manufacturing is complete. However, these ECID circuits must be part of the integrated circuit design and require special equipment to encode the information on the IC chip. Many smaller companies lack the means to implement ECID and many IC designs lack the space or cannot support the cost of ECID. Accordingly, there exists a need in the art to mitigate the deficiencies and limitations described hereinabove.

BRIEF SUMMARY

A first aspect of the present invention is a method of encoding information on an integrated circuit chip, comprising: selecting a set of chip pads of the integrated circuit chip for encoding the information; encoding the information during a wirebonding process, the wirebonding process comprising forming ball bonds on chip pads of the integrated circuit chip and wedge bonds on leadframe fingers adjacent to one or more edges of the integrated circuit chip, the ball bonds and the wedge bonds connected by respective and integral wires; and wherein the information is encoded by varying one or more wirebonding parameters on each chip pad of the set of chip pads, the wirebonding parameters selected from the group consisting of the location of a ball bond on a chip pad, the diameter of a ball bond on a chip pad, both the location and diameter of a ball bond on a chip pad, the location of a wedge bond on a leadframe finger and combinations thereof.

A second aspect of the present invention is a structure encoding information on an integrated circuit chip, comprising: a set of chip pads on the integrated circuit chip and corresponding leadframe fingers adjacent to a perimeter of the integrated circuit chip; ball bonds on the chip pads of the integrated circuit chip and wedge bonds on the leadframe fingers, the ball bonds and the wedge bonds connected by respective and integral wires; and wherein said information is encoded by locations of ball bonds on selected chip pads, diameters of a ball bonds on selected chip pads, both the locations and diameters of ball bonds on selected chip pads, locations of wedge bonds on selected leadframe fingers and combinations thereof.

These and other aspects of the invention are described below.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings, wherein:

DETAILED DESCRIPTION

The embodiments of the present invention encode integrated circuit specific information based on the position of the ball bond of wirebonds, the size of the ball bond of wirebonds or a combination of the position and size of ball bonds of wirebonds on chip pads of integrated circuit chips. Alternatively, the embodiments of the present invention may be practiced using the position of the wedge bond of wirebonds on leadframe fingers of integrated circuit modules.

It is a critical feature of the embodiments of the present invention that the position of the ball bond of wirebonds, the size of the ball bond of wirebonds or a combination of the position and size of ball bonds of wirebonds that are used to encode information are placed on chip pads selected for encoding information so that other ball bonds on non-selected chip pads do not encode information even if they mimic the encoded structures as to position of the ball bond or size of the ball bond on the non-selected chip pads.

Examples of information that may be encoded according to the embodiments of the present information include, but are not limited to: a unique integrated circuit chip identity, a location of the integrated circuit chip on a wafer during fabrication (hundreds of chips may be fabrication on the same wafer simultaneously and then singulated after fabrication is complete), a unique wafer identity, a wafer lot number, an integrated circuit design revision, fabrication facility, a date of manufacture of the integrated circuit chip, a technology type, a fabrication process change level, a semiconductor substrate lattice orientation, a chip performance (speed) sort, a degree of functionality, and a customer identity (the entity that the chips are manufactured for).

Figure 1:
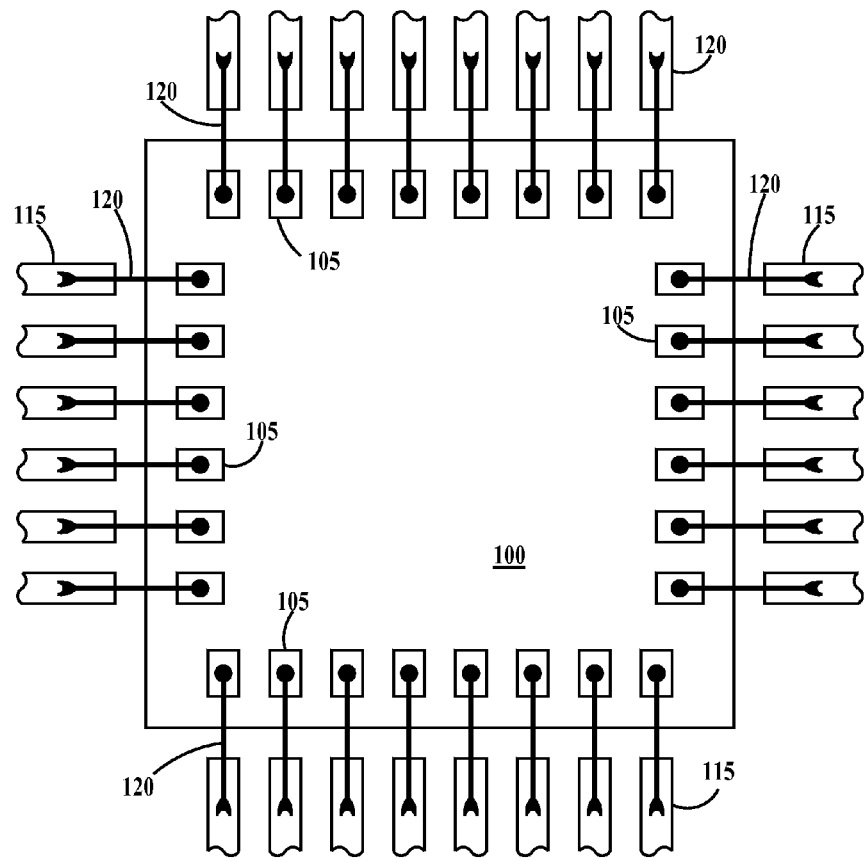
FIG. 1 a top view of an exemplary integrated circuit chip illustrating interconnection of the chip to a leadframe using wirebonds.

FIG. 1 a top view of an exemplary integrated circuit chip illustrating interconnection of the chip to a leadframe using wirebonds. In FIG. 1, an integrated circuit chip includes a plurality of chip pads 105 arranged around the perimeter of integrated circuit chip 100. A plurality of leadframe fingers 115 are arranged opposite chip pads 105, but do not touch integrated circuit chip 100. Chip pads 105 are connected to respective leadframe fingers 115 by electrically conductive wirebonds 120. Chip pads 105 are electrically connected to semiconductor devices (e.g., field effect transistors (FETs)) of integrated circuit chip 100. Chip pads 105 may carry signals in and out of integrated circuit chip 100 or may supply power to integrated circuit chip 100. While four rows of chip pads adjacent to respective edges of integrated circuit chip 100 are illustrated, there may be less than four rows. For example, there may be only two rows arranged on opposite sides of integrated circuit chip 100 (see FIG. 12). Further, while a single row of chip pads 105 is located adjacent to each edge of integrated circuit chip 100, there may be two rows, an outer row of chip pads between an edge of the integrated circuit chip and inner row of chip pads. There may be two or more wirebonds to the same chip pad. There may be two or more wire bond to the same leadframe finger. Some chip pads may not have any wirebonds formed to them.

In an enhancement to the embodiments of the present invention, dummy chip pads may be included that are used only for encoding information. Dummy chip pads are not connected to circuits within the integrated circuit chip nor to they carry signals, power or ground. Dummy chip pads may within a row or column of normal pads and may include some or all of the chip pads in the row or column. When there are two rows of chip pads, the dummy chip pads may be in the inner or outer row or column of chip pads. Dummy chip pads need not be arranged in rows or columns, but may be replaced anywhere on the integrated circuit chip.

Figure 2:
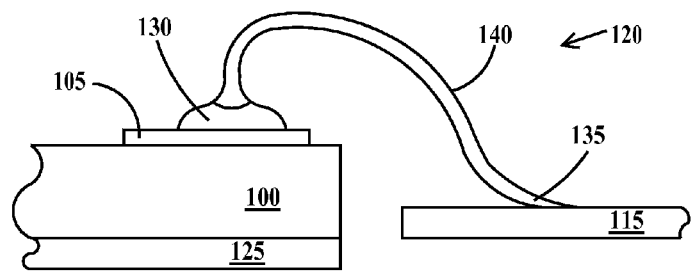
FIG. 2 is a side view of an exemplary wirebond.

FIG. 2 is a side view of an exemplary wirebond. In FIG. 2, integrated circuit chip 100 is attached to a chip carrier 125. Wire bond 120 comprises a ball bond 130 formed on chip pad 105 and a wedge bond 135 formed on leadframe finger 115. Ball bond 130 is connected to wedge bond 135 by a wire 140 integral to both the wedge bond 135 and ball bond 130. Wirebonds are formed by an automatic programmable wirebonding machine. In one example, the wirebonding process includes (i) feeding a wire through a capillary supplied by a spool of wire, (ii) melting the end of the wire that protrudes from the capillary forming a ball end, (iii) attaching the ball end to the chip pad by compression and ultrasonic bonding, (iv) looping the wire to the leadframe finger, (v) compression and ultrasonic bonding the wire to the leadframe to form a wedge bond, and (vi) breaking the wire at the wedge bond and starting the process over again on a different chip pad. The wire bonding machine has the capability to control the volume (and thus the diameter) of the ball bond precisely. The wire bonding machine has the capability to position the ball bond on the chip pad precisely. The wire bonding machine has the capability to position the wedge bond on the leadframe finger precisely. The wire bonding machine has the capability to control the wire loop as to height, angle, shape and length precisely. In one example, wirebond 120 is gold.

Figure 3:
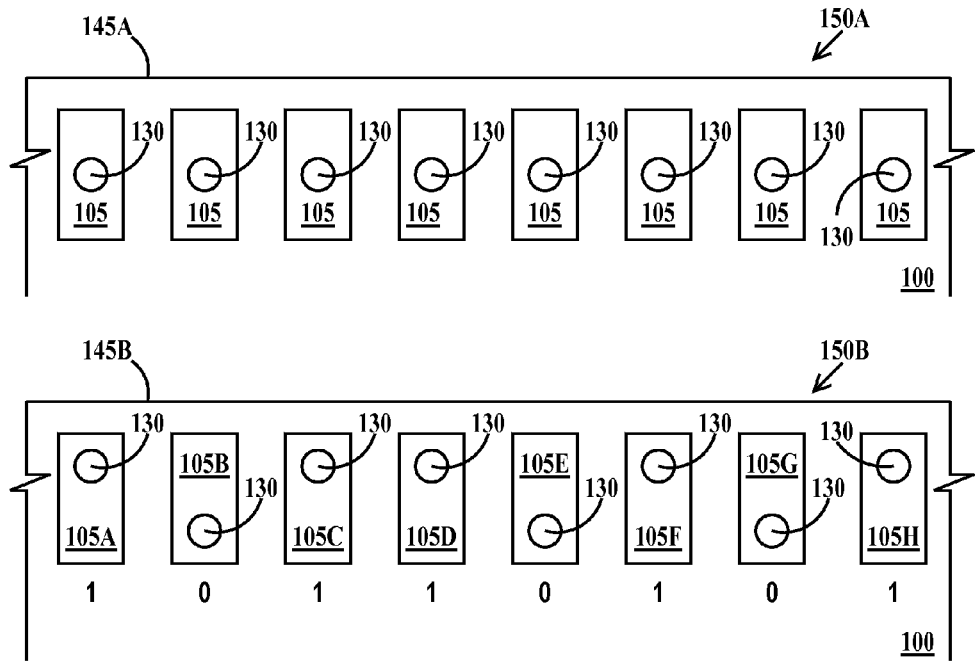
FIG. 3 illustrates a method for binary encoding of information on an integrated circuit chip using wirebonds according to embodiments of the present invention.

FIG. 3 illustrates a method for binary encoding of information on an integrated circuit chip using wirebonds according to embodiments of the present invention. In FIG. 3, only the ball bonds of the wirebonds are illustrated for clarity. In FIG. 3, a non-encoded set 150A of chip pads 105 are located adjacent to an edge 145A of integrated circuit chip 100. Ball bonds 130 are positioned in the center of respective pads 105. No information is encoded. Also in FIG. 3, an encoded set 150B of chip pads 105A through 105H are located adjacent to edge 145B of integrated circuit chip 100. Ball bonds 130 are positioned off the center of respective pads 105 with some ball bonds located at the end of chip pads closest to edge 145B and some ball bonds located at the end of chip pads furthest from edge 145B. Thus chip pads 105A, 105C, 105D, 105F and 105H encode a 1 (alternatively a 0) and chip pads 105B, 105E and 105G encode a 0 (alternatively a 1). Non-encoded set 150A and encoded set 150 B may be located adjacent to the same integrated circuit chip edge or located adjacent to different integrated circuit chip edges. Since the location and number of chip pads of the encoded set of chip pads is known, additional sets of chip pads may be used to encode dummy or nonsense information. The number of chip pads in the encoded set may be as few as one or as many as all the chip pads on an integrated circuit chip.

Figure 4:
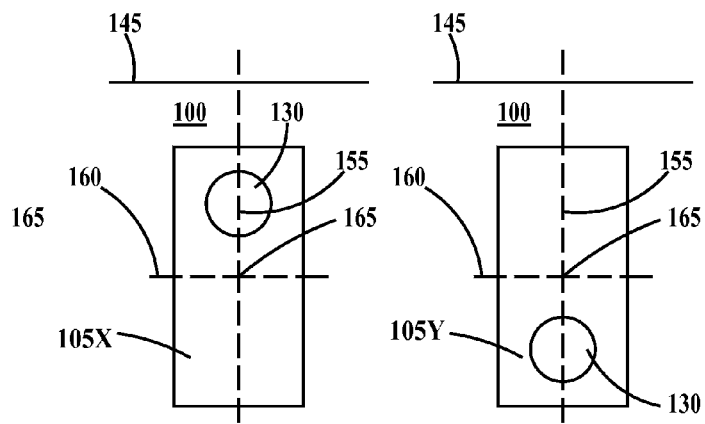
FIG. 4 illustrates in more detail, the principle of binary data encoding according to embodiments of the present invention.

FIG. 4 illustrates in more detail, the principle of binary data encoding according to embodiments of the present invention. In FIG. 4, chip pads 105X and 105Y are located adjacent to an edge 145 of an integrated circuit chip 100. Chip pads 105X and 105Y each have a first centerline 155 perpendicular to edge 145 and a second centerline 160 perpendicular to first centerline 155 and parallel to edge 145. First centerline 155 and second centerline cross 160 cross at the center 165 of chip pad 105. In a first encoding position (on the left of FIG. 4) a ball bond 130 is placed on chip pad 105X between centerline 160 and edge 145 of chip 100. In a second encoding position (on the right of FIG. 4) a ball bond 130 is placed on chip pad 105Y so centerline 160 is between ball bond 130 and edge 145 of chip 100. Second centerline 160 partitions pads 105X and 105Y into two halves, and in one example, ball bonds are placed in the center of one of the halves. The position of ball bond 130 in the direction parallel to second centerline 160 has no encoding significance in this embodiment. It is only the location of ball bond 130 in the direction parallel to first centerline 155 that has encoding significance. In other words, the first encoding position is that adjacent to the edge of the chip pad closest to the edge of the integrated circuit chip and the second encoding position is that adjacent to the edge of the chip pad furthest from the edge of the integrated circuit chip.

Figure 5:
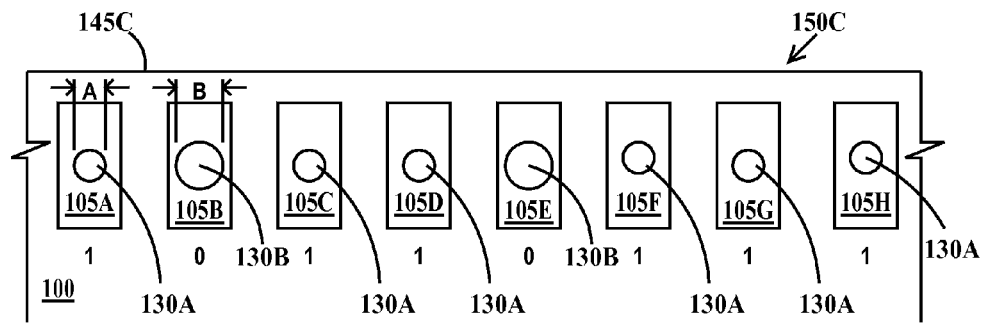
FIG. 5 illustrates non-position dependent binary data encoding of information using wirebonds according to embodiments of the present invention.

FIG. 5 illustrates non-position dependent binary data encoding of information using wirebonds according to embodiments of the present invention. In FIG. 5, only the ball bonds of the wirebonds are illustrated for clarity. In FIG. 5, an encoded set 150C of chip pads 105A through 105H are located adjacent to edge 145C of integrated circuit chip 100. Ball bonds 130A are on positioned chip pads 105A, 105C, 105D, 105F, 105G and 105H. Ball bonds 130B are positioned on chip pads 105B and 105E. Ball bonds 130A have a diameter A and ball bonds 130B have a diameter B with B being greater than A. Thus a 1 (alternatively a 0) is encoded on chip pads 105A, 105C, 105D, 105F, 105G and 105H and a 0 (alternatively a 1) is encoded on chip pads 105B and 105E. In this embodiment, the position of ball bonds carry no encoding significance and may be positioned any where on the chip pads. A non-encoding set of ball bonds would be all small (e.g., 130A) or all large (e.g., 130B). Since the location and number of chip pads of the encoding set of chip pads is known, additional sets of chip pads may be used to encode dummy or nonsense information. The number of chip pads in the encoded set may be as few as one or as many as all the chip pads on an integrated circuit chip.

If the embodiment of FIG. 5 as to the position of the ball bonds on the chip pads is combined with the embodiment of FIG. 3 as to the size of the ball bonds on the chip pads a quaternary encoding scheme is created where both the size and position of the ball bond on the chip pad encode information.

Figure 6:
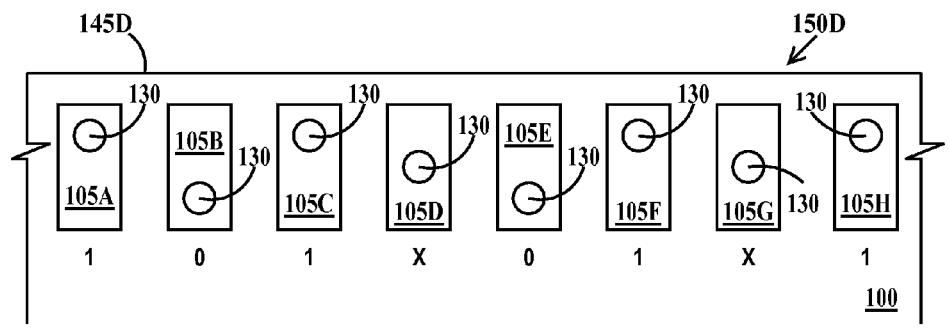
FIG. 6 illustrates a method for tertiary encoding of information on an integrated circuit chip using wirebonds according to embodiments of the present invention.

FIG. 6 illustrates a method for tertiary encoding of information on an integrated circuit chip using wirebonds according to embodiments of the present invention. In FIG. 6, only the ball bonds of the wirebonds are illustrated for clarity. In FIG. 6, an encoded set 150D of chip pads 105A through 105H are located adjacent to edge 145D of integrated circuit chip 100. Ball bonds 130 are positioned both on the center and off the center of respective pads 105A through 105H with ball some ball bonds located at the end of chip pads closest to edge 145D and some ball bonds located at the end of chip pads furthest from edge 145D and some ball bonds located on the center of chip pads. Thus a 1 (alternatively a 0) is encoded on chip pads 105A, 105C, 105F and 105H, a 0 (alternatively a 1) is encoded on chip pads 105B and 105E, and an "X" is encoded on chip pads 105D and 105G. Since the location and number of chip pads of the encoded set of chip pads is known, additional sets of chip pads may be used to encode dummy or nonsense information. The number of chip pads in the encoded set may be as few as one or as many as all the chip pads on an integrated circuit chip.

Figure 7:
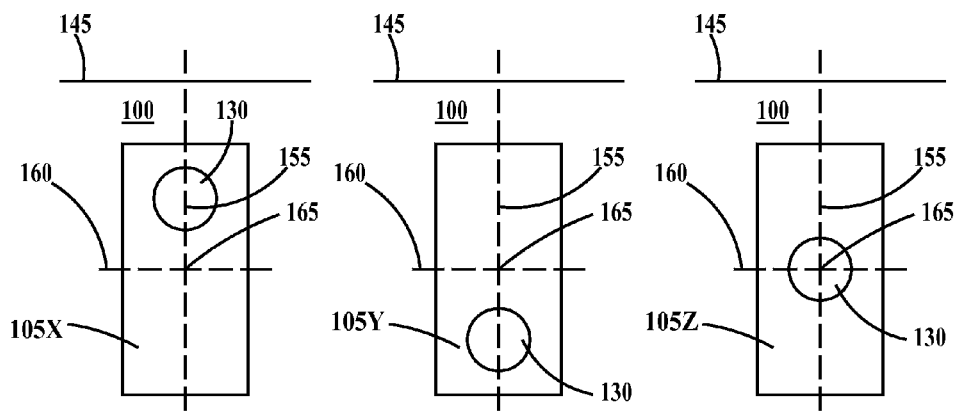
FIG. 7 illustrates in more detail, the principle of tertiary data encoding according to embodiments of the present invention.

FIG. 7 illustrates in more detail, the principle of tertiary data encoding according to embodiments of the present invention. In FIG. 7, chip pads 105X, 105Y and 105Z are located adjacent to an edge 145 of an integrated circuit chip 100. Chip pads 105X, 105Y and 105Z each have a first centerline 155 perpendicular to edge 145 and a second centerline 160 perpendicular to first centerline 155 and parallel to edge 145. First centerline 155 and second centerline cross 160 cross at the center 165 of chip pad 105. In a first encoding position (on the left of FIG. 7) a ball bond 130 is placed on chip pad 105X between centerline 160 and edge 145 of chip 100. In a second encoding position (in the center of FIG. 7) a ball bond 130 is placed on chip pad 105Y so centerline 160 is between ball bond 130 and edge 145 of chip 100. In a third encoding position (on the right of FIG. 7) a ball bond 130 is placed on the second centerline 160 of chip pad 105Z. Second centerline 160 partitions pads 105X and 105Y into two halves, and in one example, ball bonds are placed in the center of one of the halves or on the centerline. The position of ball bond 130 in the direction parallel to second centerline 160 has no encoding significance in this embodiment. It is only the location of ball bond 130 in the direction parallel to first centerline 155 that has encoding significance. In other words, the first encoding position is that adjacent to the edge of chip pad closest to the edge of the integrated circuit chip, the second encoding position is that adjacent to the edge of the chip pad furthest from the edge of the integrated circuit chip and the third encoding position is about in the center of the chip pad.

Alternatively, in a first encoding position (on the left of FIG. 7) a ball bond 130 is placed on chip pad 105X between centerline 160 and edge 145 of chip 100. In a second encoding position (in the center of FIG. 7) a ball bond 130 is placed on chip pad 105Y so centerline 160 is between ball bond 130 and edge 145 of chip 100. The third position on the right of FIG. 7 is a non-encoding position reserved for the normal position of ball bond. In this scheme FIGS. 6 and 7 become binary encoding schemes, but allow easy differential of encoded chip pads from non-encoded chip pads.

If the embodiment of FIG. 6 as to the position of the ball bonds on the chip pads is combined with the embodiment of FIG. 5 as to the size of the ball bonds on the chip pads an octanary encoding scheme is created where both the size and position of the ball bond on the chip pad encode information.

Figure 8:
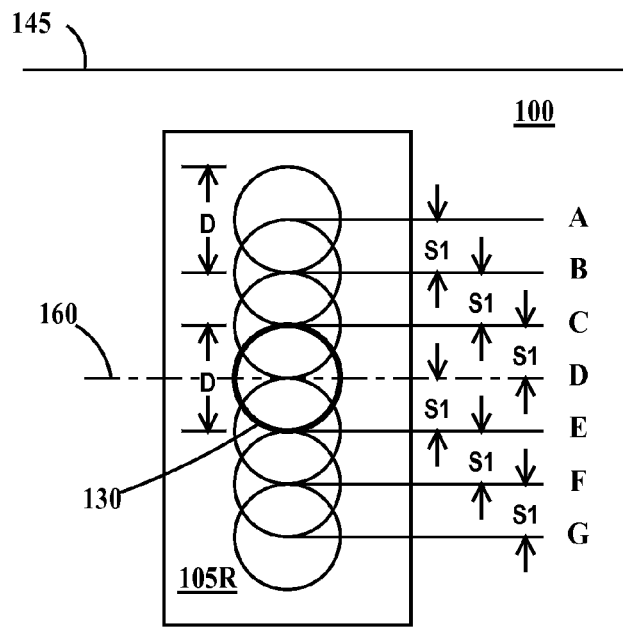
FIG. 8 illustrates a first method for N-based encoding of information on an integrated circuit chip using wirebonds according to embodiments of the present invention.

FIG. 8 illustrates a first method for N-based encoding of information on an integrated circuit chip using wirebonds according to embodiments of the present invention. The encoding scheme of FIG. 8 is similar to the encoding scheme of FIG. 7 except the allowed positions A through G for the center of the ball bond and they overlap so a septenary (base N=9) encoding scheme is encoded. Ball bond 130 is shown in by the heavy circle in position D, while the lighter circles show the other allowable eight positions for the ball bond. In FIG. 7, by way of example, ball bonds have a diameter D and the allowable spacing between locations is S1, where S1=D/2. In other examples S1>D/2 or S1<D/2. While FIG. 8 illustrates seven allowable positions for a ball bond, there may be three or more allowable positions for a ball bond.

Alternatively, only positions A, B, C, E, and G are encoding positions and encoding position D is a non-encoding position reserved for the normal position of ball bond. In this scheme FIG. 8 becomes a senary (base N=6) encoding schemes, but allow easy differential of encoded chip pads from non-encoded chip pads.

Figure 9:
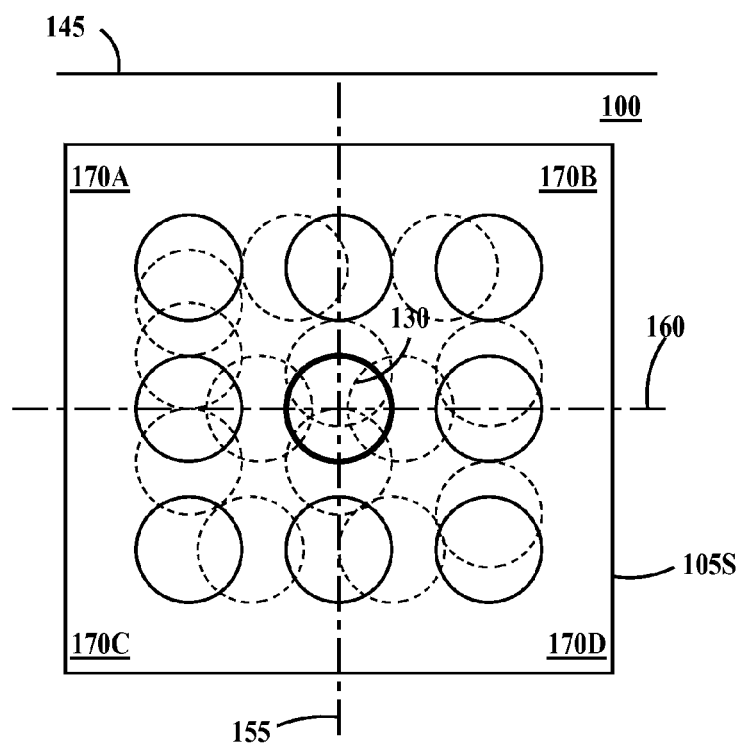
FIG. 9 illustrates a second method for N-based encoding of information on an integrated circuit chip using wirebonds according to embodiments of the present invention.

FIG. 9 illustrates a second method for N-based encoding of information on an integrated circuit chip using wirebonds according to embodiments of the present invention. In FIG. 9 a chip pad 105S is divided into four equal area quadrants 170A, 170B, 170C and 170D by first centerline 155 and second centerline 160. There are nine allowable positions to place the ball bond to encode information on chip pad 105S, eight are shown by the light circles and the ninth is shown as a dark circle representing a ball bond 130 over the intersection of first centerline 155 and second centerline 160. The other eight positions are completely within quadrant 170A, completely within quadrant 170B, completely within quadrant 170C, completely within quadrant 170D, on first centerline 155 and overlapping only and both quadrants 170A and 170B, on first centerline 155 and overlapping only and both quadrants 170C and 170D, on second centerline 160 and overlapping only and both quadrants 170A and 170C, and on second centerline 160 and overlapping only and both quadrants 170B and 170D. While FIG. 9 illustrates nine allowable positions for a ball bond, there may be four or more allowable positions for a ball bond. While FIG. 9 shows a 3 by 3 matrix of ball bond positions, the ball bond positions may be in a form of an R row by C column matrix with R and C each being independently equal to 2 or more. When R=1 and C=2 this embodiment reduces to that illustrated in FIGS. 3 and 4. When R=1, and C=3 this embodiment reduces to that illustrated in FIGS. 6 and 7.

Alternatively, the position over the intersection of first centerline 155 and second centerline 160 is a non-encoding position reserved for the normal position of the ball bond and the eight other positions are encoding positions. In this scheme FIG. 9 becomes an octanary (base N=8) encoding schemes, but allow easy differential of encoded chip pads from non-encoded chip pads.

Alternatively, encoding positions may overlap as in FIG. 8 and shown in FIG. 9 by the dashed circles. Thus, the encoding base number can be a very large number and each position could represent a entire "word" rather than a bit of information.

Figure 10:
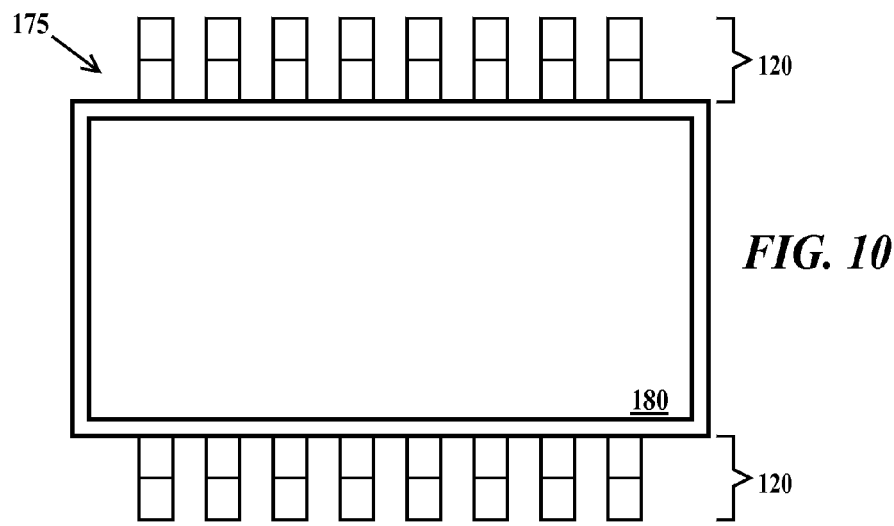
FIG. 10 is a top view of a wirebonded integrated circuit module.
Figure 11:
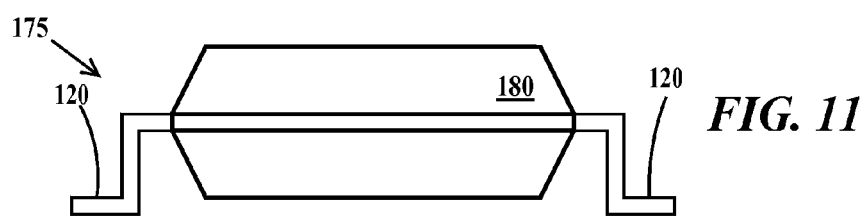
FIG. 11 is a side view of a wirebonded integrated circuit module.

FIG. 10 is a top view and FIG. 11 is a side view of a wirebonded integrated circuit module 175. In FIGS. 10 and 11, an integrated chip (not shown in FIGS. 10 and 11) is encapsulated in a plastic body 180 with leadframe fingers 120 extending outside of plastic body 180. As can be seen in FIG. 11, leadframe fingers 120 are bent into "feet" for solder attach to a printed circuit board or other higher level of packaging. While leadframe fingers 120 are shown only on two sides of plastic body 180, in other form factors, leadframe fingers extend from all four sides of the body.

In one example, in order to "read" the information encoded on the chip pads, the integrated circuit may be de-packaged, for example by placing the module in hot sulfuric acid to remove the plastic body and leadframe and leave the wire bond attached to the integrated circuit chip. However, modern X-ray equipment, and particularly those equipped with pattern recognition software, can "see through" the module as illustrated in FIG. 12.

Figure 12:
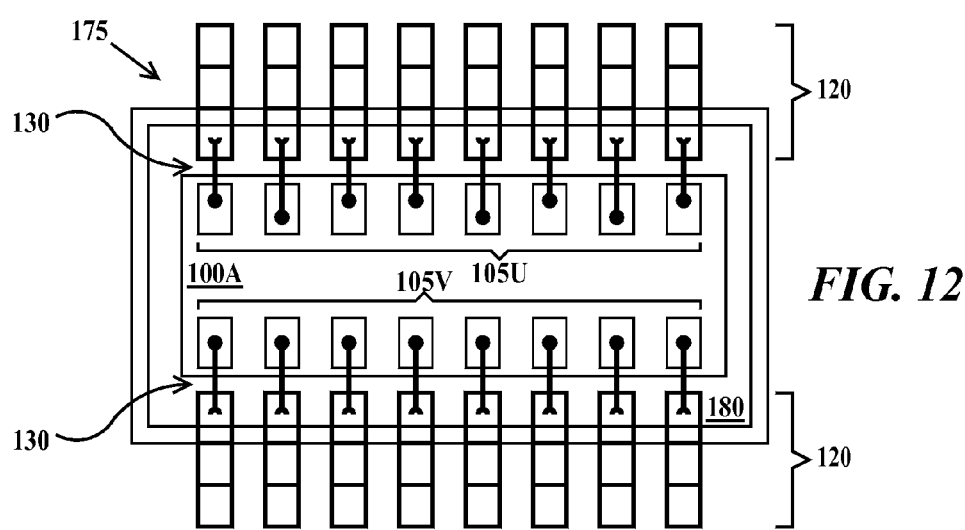
FIG. 12 simulates an X-ray of an integrated circuit chip that encodes information according to embodiments of the present invention.

FIG. 12 simulates an X-ray of an integrated circuit chip that encodes information according to embodiments of the present invention. In FIG. 12, the heaviest lines are the wirebonds 130, the medium lines are the leadframe fingers/feet 120 and the lightest lines are the chip 100A, chip pads 105U and 105V and plastic body 180. Chip pads 105U have been encoded using a binary scheme, while chip pads 105V have not been encoded The binary code on chip pads 105U can be easily read. With pattern recognition software coupled to a cross-reference table of ball bond position/size and alphanumeric value, the information can automatically be displayed or printed out.

Figure 13:
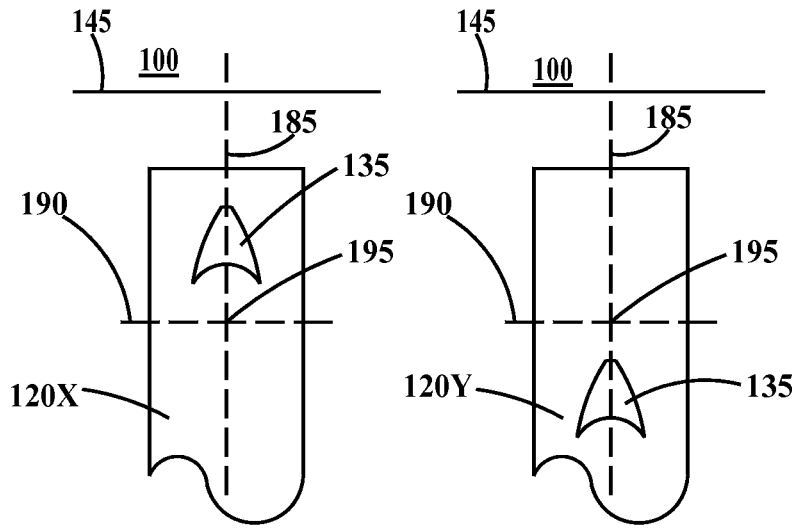
FIG. 13 illustrates the principle of binary data encoding using the wedge bond according to embodiments of the present invention.

FIG. 13 illustrates the principle of binary data encoding using the wedge bond according to embodiments of the present invention. In FIG. 13, lead frame fingers 120X and 120Y are located adjacent to an edge 145 of an integrated circuit chip 100. Lead frame fingers 120X and 120Y each have a first centerline 185 perpendicular to edge 145 and a second centerline 190 perpendicular to first centerline 185 and parallel to edge 145. First centerline 185 and second centerline cross 190 cross at the center 195 at a predetermined point on leadframe fingers 120X and 120Y. In a first encoding position (on the left of FIG. 13) a wedge bond 135 is placed on leadframe finger 120X between centerline 190 and edge 145 of chip 100. In a second encoding position (on the right of FIG. 13 a wedge bond 135 is placed on leadframe finger 120Y so centerline 190 is between wedge bond 135 and edge 145 of chip 100. Second centerline 190 partitions leadframe fingers 120X and 120Y into two regions, and in one example, wedge bonds are placed on first centerline 185 in one of the regions. The position of wedge bond 135 in the direction parallel to second centerline 190 has no encoding significance in this embodiment. It is only the location of wedge bond 135 in the direction parallel to first centerline 185 that has encoding significance. In other words, the first encoding position is that adjacent to the edge of the leadframe finger closest to the edge of the integrated circuit chip and the second encoding position is that adjacent to the edge of the leadframe finger furthest from the edge of the integrated circuit chip.

Figure 14:
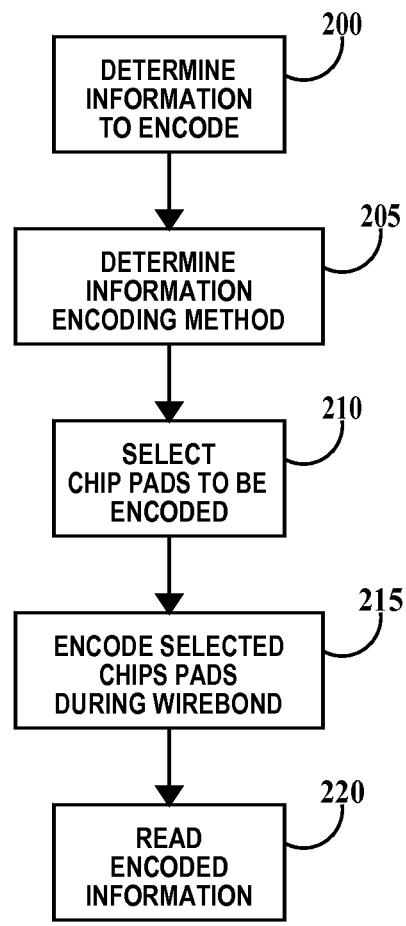
FIG. 14 is a flow diagram of the method of encoding information using wirebonds according to embodiments of the present invention.

FIG. 14 is a flow diagram of the method of encoding information using wirebonds according to embodiments of the present invention. In step 200, the information to be encoded using wirebonds is determined. In step 205, the method for encoding information is selected from the various embodiments of the present invention. In step 210, the chip pads (or leadframe fingers) on which the information is to be encoded are selected. In step 215, the selected chip pads are encoded during wirebonding. In step 220, the encoded information is read. Between steps 215 and 220, the encoded integrated circuit chip may be packaged (e.g., in a plastic form package) and optionally mounted on a higher level of packaging (e.g., a printed circuit board).

Thus, the embodiments of the present invention provide methods and structures for encoding information on individual integrated circuits.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of encoding information on an integrated circuit chip, comprising:
    selecting a set of chip pads of said integrated circuit chip for encoding said information;
    encoding said information during a wirebonding process, said wirebonding process comprising forming ball bonds on chip pads of said integrated circuit chip and wedge bonds on leadframe fingers adjacent to one or more edges of said integrated circuit chip, said ball bonds and said wedge bonds connected by respective and integral wires; and
    wherein said information is encoded by varying one or more wirebonding parameters on each chip pad of said set of chip pads, said wirebonding parameters selected from the group consisting of the location of a ball bond on a chip pad, the diameter of a ball bond on a chip pad, both the location and diameter of a ball bond on a chip pad, the location of a wedge bond on a leadframe finger and combinations thereof.

2. The method of claim 1, wherein said information is encoded by positioning respective ball bonds of wirebonds on each chip pad of said set of chip pads relative to the centers of said chip pads and relative to an edge of said integrated circuit chip adjacent to said set of chip pads.

3. The method of claim 1, wherein said information is encoded by positioning respective ball bonds of wirebonds on each chip pad of said set of chip pads in one of two different locations relative to the centers of said chip pads and relative to an edge of said integrated circuit chip adjacent to said set of chip pads.

4. The method of claim 1, wherein said information is encoded by positioning respective ball bonds of wirebonds on each chip pad of said set of chip pads in one of N different locations relative to the centers of said chip pads and relative to an edge of said integrated circuit chip adjacent to said set of chip pads, wherein N is an integer equal to or greater than 3.

5. The method of claim 4, wherein said N different locations are an R by C matrix wherein N is equal to R multiplied by C, R and C are independently an integer equal to or greater than one with the proviso that when R is equal to one, C is equal to N and when C is equal to one, R is equal to N.

6. The method of claim 4, wherein the centers of said N different locations are aligned in a direction perpendicular to the edge of said integrated circuit chip and except for end locations of said N locations, each of said N locations overlaps two immediately adjacent locations.

7. The method of claim 1, wherein said information is encoded by the diameters of respective ball bonds of wirebonds on each chip pad of a selected set of chip pads; said ball bonds having either a first diameter or a second diameter, said second diameter greater than said first diameter.

8. The method of claim 1, wherein said information is encoded by (i) the position of respective ball bonds of wirebonds on each chip pad of a selected set of chip pads in one of N different locations relative to the centers of said chip pads and relative to an edge of said integrated circuit chip adjacent to said set of chip pads and (ii) by the diameters of respective ball bonds of said wirebonds on each chip pad of said set of chip pads; said ball bonds having either a first diameter or a second diameter, said second diameter greater than said first diameter, and wherein N is an integer equal to or greater than 2.

9. The method of claim 1, wherein said information is encoded by the position of respective wedge bonds of wirebonds on a set of leadframe fingers corresponding to a selected set of chip pads, said wedge bonds positioned in one of two different locations on said leadframe fingers relative to an edge of said integrated circuit chip.

10. The method of claim 1, wherein said information is selected from the group consisting of unique integrated circuit chip identity, a location of an integrated circuit chip on a wafer during fabrication, a unique wafer identity, a wafer lot number, an integrated circuit design revision, a fabrication facility, a date of manufacture, a technology type, a fabrication process change level, a semiconductor substrate lattice orientation, an integrated circuit chip performance sort, a degree of functionality, and a customer identity.

11. A structure encoding information on an integrated circuit chip, comprising:
a set of chip pads on said integrated circuit chip and a corresponding leadframe fingers adjacent to a perimeter of said integrated circuit chip;
ball bonds on said chip pads of said integrated circuit chip and wedge bonds on said leadframe fingers, said ball bonds and said wedge bonds connected by respective and integral wires; and
wherein said information is encoded by locations of ball bonds on selected chip pads, diameters of a ball bonds on selected chip pads, both the locations and diameters of ball bonds on selected chip pads, locations of wedge bonds on selected leadframe fingers and combinations thereof.

12. The structure of claim 11, wherein said information is encoded by the location of respective ball bonds of wirebonds on each chip pad of a selected set of chip pads relative to the centers of said chip pads and relative to an edge of said integrated circuit chip adjacent to said set of chip pads.

13. The structure of claim 11, wherein said information is encoded by the position respective ball bonds of wirebonds on each chip pad of a selected set of chip pads in one of two different locations relative to the centers of said chip pads and relative to an edge of said integrated circuit chip adjacent to said set of chip pads.

14. The structure of claim 11, wherein said information is encoded by the position of respective ball bonds of wirebonds on each chip pad of a selected set of chip pads in one of N different locations relative to the centers of said chip pads and relative to an edge of said integrated circuit chip adjacent to said set of chip pads, wherein N is an integer equal to or greater than 3.

15. The structure of claim 14, wherein said N different locations are an R by C matrix wherein N is equal to R multiplied by C, R and C are independently an integer equal to or greater than one with the proviso that when R is equal to one, C is equal to N and when C is equal to one, R is equal to N.

16. The structure of claim 14, wherein the centers of said N different locations are aligned in a direction perpendicular to the edge of said integrated circuit chip and except for end locations of said N locations, each of said N locations overlaps two immediately adjacent locations.

17. The structure of claim 11, wherein said information is encoded by the diameters of respective ball bonds of wirebonds on each chip pad of said set of chip pads; said ball bonds having either a first diameter or a second diameter, said second diameter greater than said first diameter.

18. The structure of claim 11, wherein said information is encoded by (i) positioning respective ball bonds of wirebonds on each chip pad of said set of chip pads in one of N different locations relative to the centers of said chip pads and relative to an edge of said integrated circuit chip adjacent to said set of chip pads and (ii) by the diameters of respective ball bonds of said wirebonds on each chip pad of said set of chip pads; said ball bonds having either a first diameter or a second diameter, said second diameter greater than said first diameter, and wherein N is an integer equal to or greater than 2.

19. The structure of claim 11, wherein said information is encoded by positioning respective wedge bonds of wirebonds on a set of leadframe fingers corresponding to a selected set of chip pads, said wedge bonds positioned in one of two different locations on said leadframe fingers relative to an edge of said integrated circuit chip.

20. The structure of claim 11, wherein said information is selected from the group consisting of a unique integrated circuit chip identity, a location of an integrated circuit chip on a wafer during fabrication, a unique wafer identity, a wafer lot number, an integrated circuit design revision, a fabrication facility, a date of manufacture, a technology type, a fabrication process change level, a semiconductor substrate lattice orientation, an integrated circuit chip performance sort, a degree of functionality, and a customer identity.

* * * * *